(12) United States Patent
Blackwood et al.

(10) Patent No.: US 7,727,313 B2
(45) Date of Patent: Jun. 1, 2010

(54) AIR DRYER

(75) Inventors: Andrew Blackwood, Shipley (GB); Ignitius Milomo, Bradford (GB); Mark Paling, Leeds (GB)

(73) Assignee: Wabco Automotive UK Limited, Morely, Leeds (GB)

( * ) Notice: Subject to any disclaimer, the term of this patent is extended or adjusted under 35 U.S.C. 154(b) by 289 days.

(21) Appl. No.: 11/718,663

(22) PCT Filed: Nov. 2, 2005

(86) PCT No.: PCT/GB2005/004229

§ 371 (c)(1),
(2), (4) Date: Mar. 4, 2008

(87) PCT Pub. No.: WO2006/048640

PCT Pub. Date: May 11, 2006

(65) Prior Publication Data

US 2009/0038476 A1 Feb. 12, 2009

(30) Foreign Application Priority Data

Nov. 4, 2004 (GB) ................................. 0424480.2

(51) Int. Cl.
*B01D 53/04* (2006.01)
*B01D 53/26* (2006.01)
(52) U.S. Cl. ........................ 96/134; 55/432; 55/DIG. 17
(58) Field of Classification Search ................... 96/134, 96/138, 142; 55/385.3, 432, 434, DIG. 17; 34/80
See application file for complete search history.

(56) References Cited

U.S. PATENT DOCUMENTS 5,286,283 A  2/1994  Goodell (Continued)

FOREIGN PATENT DOCUMENTS

| WO | WO 01/52973 | 7/2001 |
| WO | WO 2004/011125 | 2/2004 |
| WO | WO 2004/103509 | 12/2004 |
| WO | WO 2005/051521 | 6/2005 |

*Primary Examiner*—Frank M Lawrence
(74) *Attorney, Agent, or Firm*—Downs Rachlin Martin PLLC

(57) ABSTRACT

The present invention relates to an air dryer (10) for a vehicle air system. The air dryer (10) includes a body (12) and a desiccant canister (14), the body (12) having an inlet (16) to receive air from an air source, an outlet (18) to supply air to a vehicle air system, a purge outlet and a regeneration inlet (24) to receive regenerative airflow from the vehicle air system. The body (12) is further provided with a chamber (28) containing a coalescer (38)positioned between the inlet (16) and the desiccant canister (14), and a bypass valve (34) positioned between the chamber (28) and the purge outlet. The coalescer (38) and bypass valve (34) are arranged such that during normal operation air entering through the inlet (16) passes through the coalescer (38) before reaching the desiccant canister (14) and during regeneration of the desiccant a portion of the regeneration flow passes through the coalescer (38) and the remainder of the regeneration flow bypasses the coalescer (38) through the bypass valve (34). The chamber (28) and coalescer (38) are fully provided within the air dryer body (12).

20 Claims, 4 Drawing Sheets

U.S. PATENT DOCUMENTS

| | | |
|---|---|---|
| 5,334,230 A | 8/1994 | Sloka |
| 5,427,609 A | 6/1995 | Zoglman et al. |
| 5,522,150 A * | 6/1996 | Schultz .......................... 34/80 |
| 5,607,500 A * | 3/1997 | Shamine et al. ................ 96/144 |
| 6,730,143 B1 * | 5/2004 | Nichols et al. ................ 95/118 |
| 7,118,614 B2 * | 10/2006 | Welin et al. ................... 96/132 |

* cited by examiner

AIR DRYER

The present invention relates to a vehicle air dryer and in particular, though not exclusively, to an air dryer suitable for use with a pneumatic braking system of a road vehicle.

The provision of air drying apparatus, hereinafter referred to as an air dryer, in vehicle air systems is well known. The air dryer apparatus is typically positioned intermediate an air source, for example a compressor, and a reservoir. The air dryer includes a desiccant material, for example a moisture adsorbing material such as silica gel, which removes moisture from the air supplied by the compressor so as to prevent said moisture being deposited downstream in the vehicle air system where it may over time damage components of the air system. So as to address the build up of moisture in the desiccant material the air dryer is periodically purged to atmosphere with dry air from the reservoir. Purging of the desiccant is typically undertaken during periods when the compressor is idle and no significant demands for dry air are being made of the reservoir. The desiccant material is typically provided in a removable canister, hereinafter referred to as a cartridge, which is releasably attached to the air dryer. The cartridge is periodically replaced so as to take into account degradation in the performance of the desiccant material over time.

It is not unknown for the air supplied by the compressor to include a mist of very fine oil droplets. The oil droplets are generated from the lubricating oil present in the compressor by the reciprocating action of the compressor. The oil mist typically passes through the air dryer and is subsequently deposited in the reservoir or further downstream in vehicle air system. While oil deposited in this manner is much less likely to damage air system components in the same manner as moisture, its deposit may lead over time to such problems as, for example, the constriction of narrow passageways in air system components, the degradation of elastomeric seals, and the degradation of non-oil based lubricants present within the air system. It is an object of the present invention to provide an improved air dryer which seeks to prevent the transmission of oil therethrough.

According to a first aspect of the present invention there is provided an air dryer for a vehicle air system, the air dryer including a body and a desiccant canister, the body having an inlet to receive air from an air source, an outlet to supply air to a vehicle air system, a purge outlet and a regeneration inlet to receive regenerative airflow from the vehicle air system, wherein the body is further provided with a chamber containing a coalescing means positioned between the inlet and the desiccant canister, and a bypass valve positioned between the chamber and the purge outlet, the coalescing means and bypass valve being arranged such that during normal operation air entering through the inlet passes through the coalescing means before reaching the desiccant and during regeneration of the desiccant a portion of the regeneration flow passes through the coalescing means and the remainder of the regeneration flow bypasses the coalescing means through the bypass valve, wherein the chamber and coalescing means are fully provided within the air dryer body.

The inclusion of the bypass valve ensures that all of the fluid entering the air dryer during normal operation is routed through the coalescing means before reaching the desiccant, while permitting the regeneration flow to be split such that a portion of the flow is directed through the coalescing means in the reverse direction, while the remainder of the regeneration flow bypasses the coalescing means.

The bypass valve preferably includes a valve member which is urged to a closed position, thereby preventing the flow of fluid through the valve, by fluid flow entering the air dryer through the inlet. The bypass valve may comprise a flow passage having a movable valve member contained therein. In such an embodiment the flow passage may be provided with a seat and the valve member be movable between a position in contact with the seat and a position spaced from the seat. The flow passage and valve member may be arranged such that under certain operating circumstances the valve member may move from the seat position under the influence of gravity. The valve member may comprise a discrete component which is separate from the flow passage and freely movable therein. Alternatively the valve member may be constrained to move within a portion of the flow passage. For example the valve member may be connected to a tether or located between appropriately configured stops.

In an alternative embodiment the valve member may take the form of a flexible member. In such an embodiment the flexible member may be provided with a proximal portion fixed to a feature of the dryer body, and a movable distal portion. In such an embodiment the flexible member may be positioned in a lower region of the chamber between the coalescing means and the base of the chamber. It will be appreciated that different arrangements of the bypass valve may be possible.

The chamber may further include a sump associated with the coalescing means. The sump serves to collect liquid removed from incoming airflow entering the cartridge. Preferably the sump is located in the vicinity of the bypass valve such that purge flow directed through the valve entrains any liquid contained in the sump. In a preferred embodiment the chamber may be provided with two sumps arranged on respective upstream and downstream sides of the coalescing means. The coalescing means is preferably cylindrical. Preferably the coalescing means is removable from the chamber. In such an embodiment the chamber is provided with a removable cover to permit access to and removal/fitting of the coalescing means. In a preferred embodiment the coalescing means is retained between the cover and a wall of the chamber.

According to a further aspect of the present invention there is provided a body for air dryer for a vehicle air system, the air dryer body having a mounting arrangement for a desiccant canister, the body further having an inlet to receive air from an air source, an outlet to supply air to a vehicle air system, a purge outlet and a regeneration inlet to receive regenerative airflow from the vehicle air system, wherein the body is further provided with a chamber containing a coalescing means positioned between the inlet and the desiccant canister mounting, and a bypass valve positioned between the chamber and the purge outlet, the coalescing means and bypass valve being arranged such that during normal operation air entering through the inlet passes through the coalescing means before reaching a desiccant canister provided at said mounting arrangement, and during regeneration of the desiccant a portion of the regeneration flow passes through the coalescing means and the remainder of the regeneration flow bypasses the coalescing means through the bypass valve, wherein the chamber and coalescing means are fully provided within the air dryer body.

According to a further aspect of the present invention there is provided a valve including a spherical valve member and a valve seat surrounding an aperture, the valve member being movable between a first position whereupon it contacts the seat and closes the aperture and a second position whereupon it is spaced from the seat thereby opening the aperture, wherein the valve member is provided within a chamber having an inlet, an outlet and a flow redirection means intermediate the inlet and outlet, the inlet being connectable to a source of pressurised air such that airflow entering the chamber via the inlet and impinging upon the flow redirection means causes the valve member to move to and remain in the first position.

In a preferred embodiment the flow redirection means is arranged such that airflow passing thereof from the inlet to the outlet causes rotation of the valve member. In such an embodiment the flow redirection means is preferably arranged to direct the airflow tangentially across a portion of the surface of the valve member. The flow redirection means may be defined by a feature present upon a surface of the chamber. The flow redirection means may be defined by a feature of the base of the chamber. The feature may comprise a projection of the base. The projection may be defined by a member fitted to the base or by deformation of at least a portion the base. In a preferred embodiment the projection is defined by a portion of the base which projects in a convex manner into the chamber.

In a preferred embodiment the chamber and seat are arranged such that the valve member moves under the influence of gravity from the first position to the second position when the flow of air to the chamber inlet ceases. The valve member is preferably manufactured from a lightweight plastics material. The valve member may be porous so as to be able to receive and retain liquid droplets of a predetermined character, such as oil, present in the airflow entering the chamber via the inlet.

Embodiments of the present invention will now be described with reference to the accompanying drawings in which.

Figure 1:
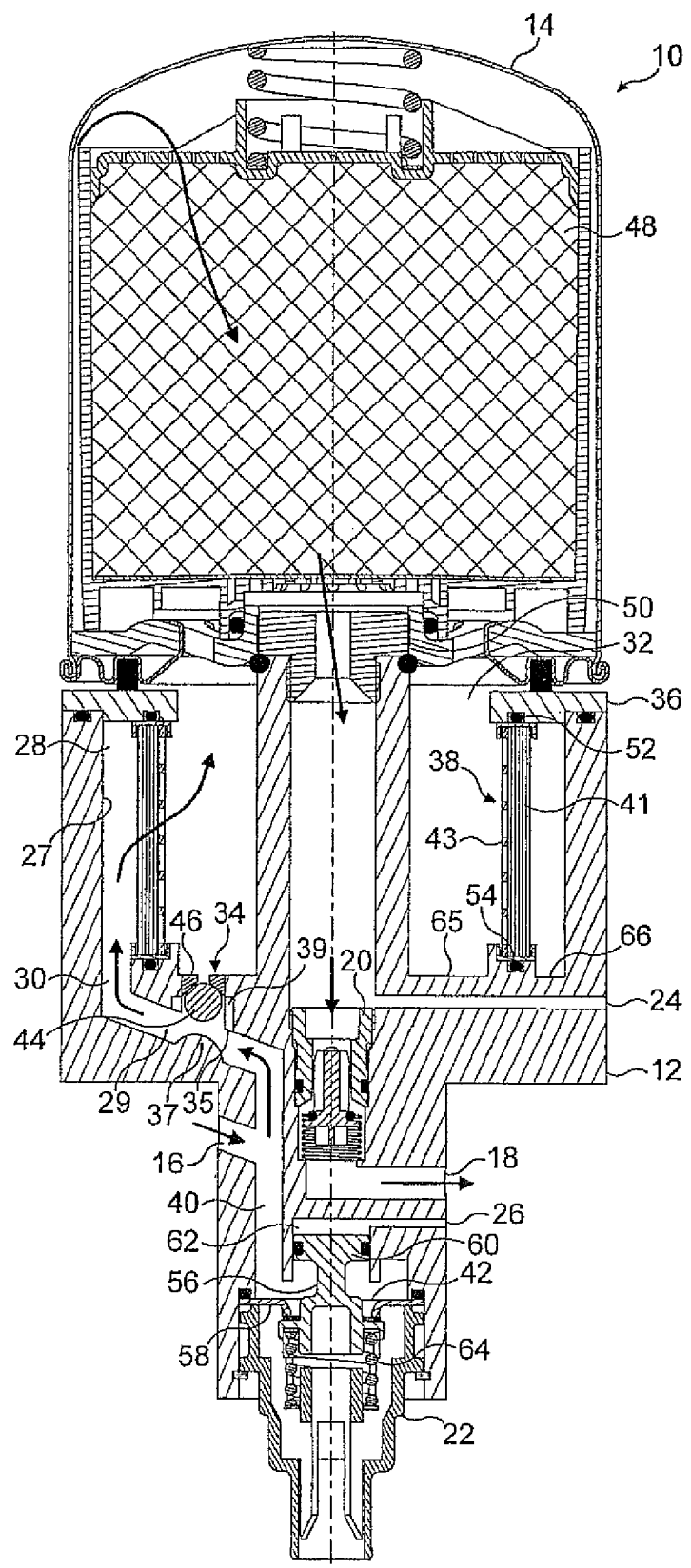
FIG. 1 shows a cross-sectional view of an air dryer according to the present invention.

Referring to the figures there is shown a vehicle air dryer generally designated 10. The air dryer essentially comprises a body 12 and a desiccant cartridge 14. The body 12 is provided with an inlet 16 connectable to a pressurised air source such as a compressor, an outlet 18 connectable to a system reservoir, a system protection valve 20 and a purge valve 22 situated within a purge port 23 of the body. The body 12 is further provided with a regeneration port 24 connectable to a regeneration reservoir and a control port 26 connectable to a source of pressurised air for actuation of the purge valve 22. The desiccant cartridge 14 is of a conventional type and contains a desiccant matrix 48 comprising a moisture adsorbent material such as, for example, pellets of silica gel. The desiccant cartridge 14 is releasably retained in association with the body 12 by means of a releasable connection 50. The connection 50 may, for example, be threaded.

Within an upper portion of the body 12 there is provided an annular chamber 28 having an inlet 30, an outlet 32 and a bypass valve 34. The dryer inlet 16 communicates with the chamber inlet 30 via a conduit 29 of the body 12. The outlet 32 is provided in a cover 36 which fits to the body 12 so as to substantially enclose the annular chamber 28. Within the chamber 28 there is provided an oil coalescing element 38 which is positioned between the inlet and the outlet 30,32. The bypass valve 34 is provided on the outlet side of the element 38 and is positioned between the annular chamber 28 and a drain passage 40 in fluid communication with both the body inlet 16 and sump 42 provided above the purge valve 22.

The bypass valve 34 is provided in a passage 35 extending between the chamber 28 and the conduit 29 and includes a spherical valve member 44 and a valve seat 46. The valve member 44 is movable into and out of contact with the seat 46 by the application of a differential pressure across the valve 34. A detailed description of the operation of the bypass valve 34 is described below with reference to FIG. 4. During instances when the valve member 44 is disengaged from the seat 46 it is prevented from leaving the passage 35 by the presence of a rounded projection 37 of the conduit 29. The passage 35 is provided with a plurality of castellations 39 in a lower portion thereof which allow fluid communication through the passage 35 and around the valve member 44 when the valve member 44 is disengaged from the seat 46.

At the base of the chamber 28 there is provided an inner sump 65 and an outer sump 66. The terms inner and outer are construed with reference to the longitudinal axis of the dryer 10. The sumps 65,66 are provided to receive liquid removed from air entering the dryer 10 as will be described in greater detail below. Under certain operating conditions of the dryer 10 the inner sump 65 is able to drain through the bypass valve 34 and into the conduit 29 prior to Gaining down to the purge valve sump 42. The outer sump 66 is also able to drain under certain operating conditions of the dryer 10 to the purge valve sump 42.

The element 38 comprises an annular tube of filter material 41 carried by a perforated sleeve 43. In such an embodiment the element 38 may be of a modular construction for ease of replacement of the filter material 41. In such an embodiment the sleeve 43 may act as a load bearing member which, in use, transmits force applied to the element 38 through the cover 36 by the desiccant cartridge 14. It will be appreciated that alternative means may be employed to locate the element 38 within the chamber 28, for example the cover 63 may be bolted to the body 12. The element 38 may, in alternative embodiments, be provided with a plurality of sleeves 43, for example the filter material 41 may be sandwiched between interior and exterior sleeves 43. The filter material 41 may comprise multiple layers of a porous material and is configured such that it both coalesces liquid droplets, such as oil and water, and traps particulate matter entering the body 12. The filter material preferably also includes a wicking layer which assists in the draining under gravity of liquid from the filter material 41. To deal with particulate matter the air dryer 10 may additionally be provided with a prefilter situated intermediate the air dryer inlet 16 and the compressor. The prefilter may be associated with the coalescing element 38, for example comprising a layer of filter material provided on the radially outer side of the element 38. The element 38 is provided with end seals 52, 54 which prevent the flow of fluid around the ends of the element 38. The seals 52, 54 may be of any appropriate type such as, for example, elastomeric 'O' ring type seals or compressible gasket type seals. The end seals 52, 54 may be of the radial type.

The purge valve 22 includes a valve member 56 and a seat 58. The valve member 56 is provided with a piston portion 60 which is received in a cylindrical portion 62 of the body 12 which is fluid communication with the control port 26. The valve member 56 is urged into contact with the seat 58 by a spring 64. The valve member 56 is movable away from the seat 58, so as to open the purge valve 22 to atmosphere, by the introduction of pressurised air to the control port 26. The system protection valve 20 permits unidirectional flow between the air dryer 10 and the system reservoir. The system protection valve 20 prevents the depressurisation of the system reservoir in the event that the desiccant cartridge is punctured or removed.

Normal operation of the air dryer 10 will now be described with reference to FIG. 1. The path of air from the inlet 16 to the outlet 18 is indicated by arrows. Incoming moist air and oil mist from the compressor is received at the inlet 16 and directed into the annular chamber 28 via the chamber inlet 30. As the purge valve 22 is closed a back pressure builds up in the sump 42 and drain passage 40 which acts to urge the valve member 44 of the bypass valve 34 against the valve seat 46 thereby closing the bypass valve 34. The incoming moist air and oil mist is therefore directed towards and through the element 38. Upon passing through the filter material of the element 38 a significant proportion of any oil mist is removed from the air flow. The filter material acts to remove the oil mist by coalescing the individual droplets forming the mist into larger droplets which are not carried by the air stream passing through the element 38. These larger droplets are either retained on or by the filter material, or drain from the filter material to a peripheral sumps 65, 66 provided in the base of the annular chamber 28 on either side of the element 38. Advantageously the filter material further serves to remove a portion of the moisture contained in the incoming air in a similar coalescing manner. As with the oil mist, water droplets in the incoming air are coalesced and retained in the filter material or drained to the sumps 65, 66.

The outer sump also acts to receive and retain liquid droplets carried by the incoming airflow which have condensed as a result of the airflow passing through piping between the compressor and the air dryer 10, liquid droplets which condense on the outer wall 27 of the chamber 28, liquid droplets which are liberated from the incoming airflow as a result of the changes of direction of the airflow upon entering the air dryer and reaching the chamber inlet 30, and liquid droplets which are separated from the incoming airflow as a result of velocity changes experienced by the airflow upon entering the dryer 10.

In passing through the element 38 a slight pressure drop is experienced by the incoming airflow. This pressure drop results in a pressure differential being experienced across the valve member 44 of the bypass valve 34 between the conduit 29 and the inner sump 65 and ensures that the valve member 44 remains seated and the bypass valve 34 closed. After passing through the element 38 the now substantially oil free air is directed though the chamber outlet 32 and into the desiccant cartridge 14. The air passes through the desiccant matrix 48 whereupon substantially all of the remaining moisture is removed. After passing through the desiccant matrix 48 the air re-enters the body 12 passing through the protection valve 20 and out through the outlet 18 to the system reservoir.

Once the supply of air from the compressor ceases, for example when the system reservoir has reached a desired pressure, it will be appreciated that the pressure differential across the bypass valve member 44 is removed. The valve member 44 is thus able to move away from the valve seat 46 under the influence of gravity, thereby opening the valve. It will thus be appreciated that liquid retained in the inner sump 65 is able to drain through the bypass valve 34 and into the drain passage 40 before finally reaching the sump 42 over the purge valve member 56. Liquid retained in the outer sump 66 on the inlet side or the chamber 28 is able to drain through the chamber inlet 30 to the drain passage 40 to the purge valve sump 42. During extended periods when there is no air supplied from the compressor liquid droplets retained in and/or on the filter material of the coalescing element 38 may drain to the sumps 65, 66 before passing to the purge valve sump 42.

As described in the introductory paragraphs above, the desiccant material of the cartridge 14 requires to be periodically regenerated with dry air to prevent it from becoming saturated with moisture and hence rendered ineffective. The flow of regenerative dry air through the air dryer is indicated by arrows present on FIG. 2. Dry regeneration airflow enters the air dryer via the regeneration port 24. The regeneration flow is directed through the body 12 to the desiccant cartridge 14 whereupon it passes through the desiccant matrix 48 and removes the moisture entrained therein. The now moist regeneration air then returns to the body 12 via the chamber outlet 32 whereupon it separates into two streams. A first stream passes through the bypass valve 34 and into the drain passage 40, while the second stream passes through the coalescing element 38 and into the drain passage 40 via the chamber inlet 30. It will be understood that the first stream urges any liquid present in the inner sump 65 through the bypass valve 34, while the second stream may advantageously entrain liquid retained in the element 38 and conveys it, along with any liquid lying in the outer sump 66 into the drain passage 40 via the chamber inlet 30.

At the same time as the flow of regeneration air commences, a control pressure is applied to the control port 26 to open the purge valve 22. The control pressure acts upon the piston portion 60 of the purge valve member 56 causing the valve member to move away from the seat 58 against the force of the spring 64. Any liquid lying in the sump 42 is thus able to drain through the purge valve 22 and out of the air dryer. The purge valve 22 remains open while the regeneration flow passes through the air dryer and thereby permits the moist air and liquid removed from the element 38 and chamber sump 66 to be vented from the air dryer 10. Once regeneration of the desiccant has been completed the control pressure applied to the control port 26 is reduced causing the purge valve 22 to close, air is no longer supplied to the regeneration port 24 and the air dryer 10 is ready to receive air from the compressor once again.

Figure 2:
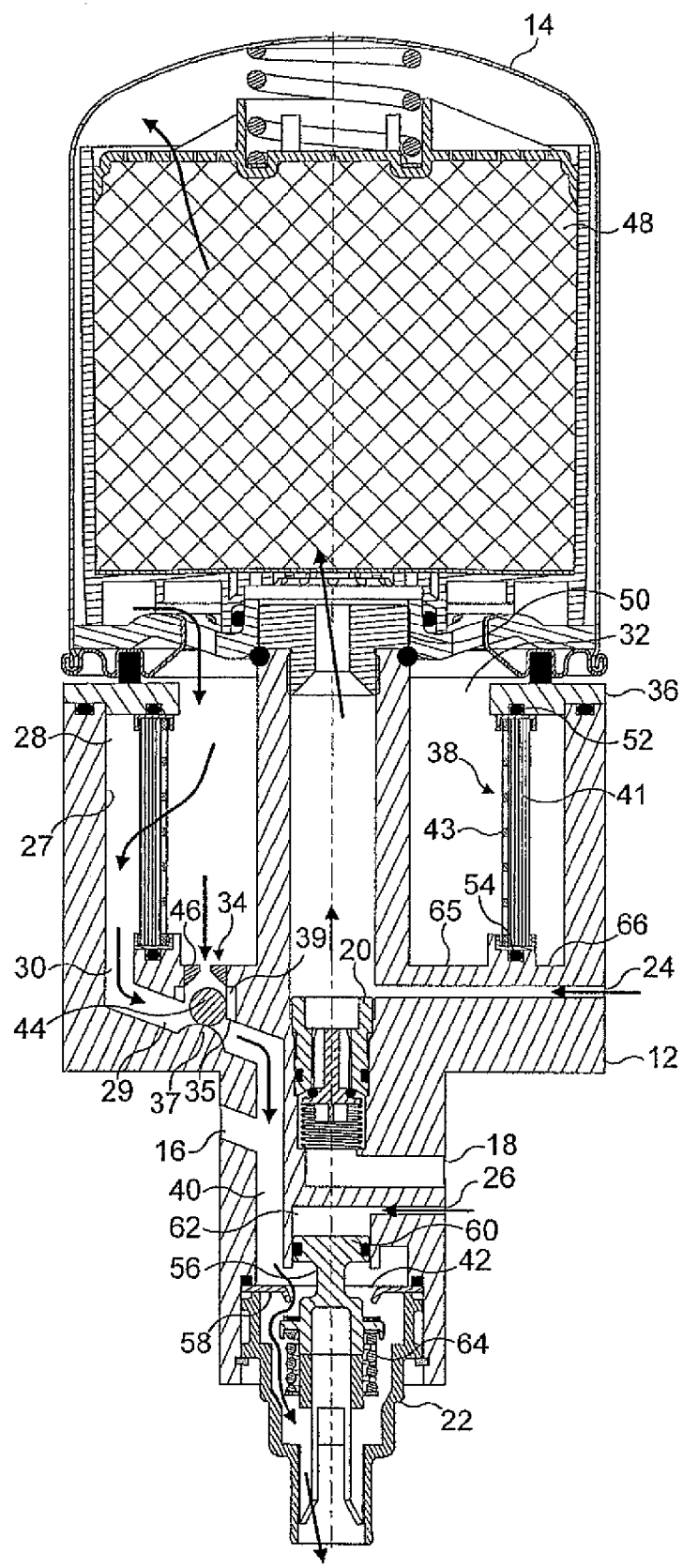
FIG. 2 shows a cross-sectional view of the dryer indicating regeneration flow therethrough.
Figure 3:
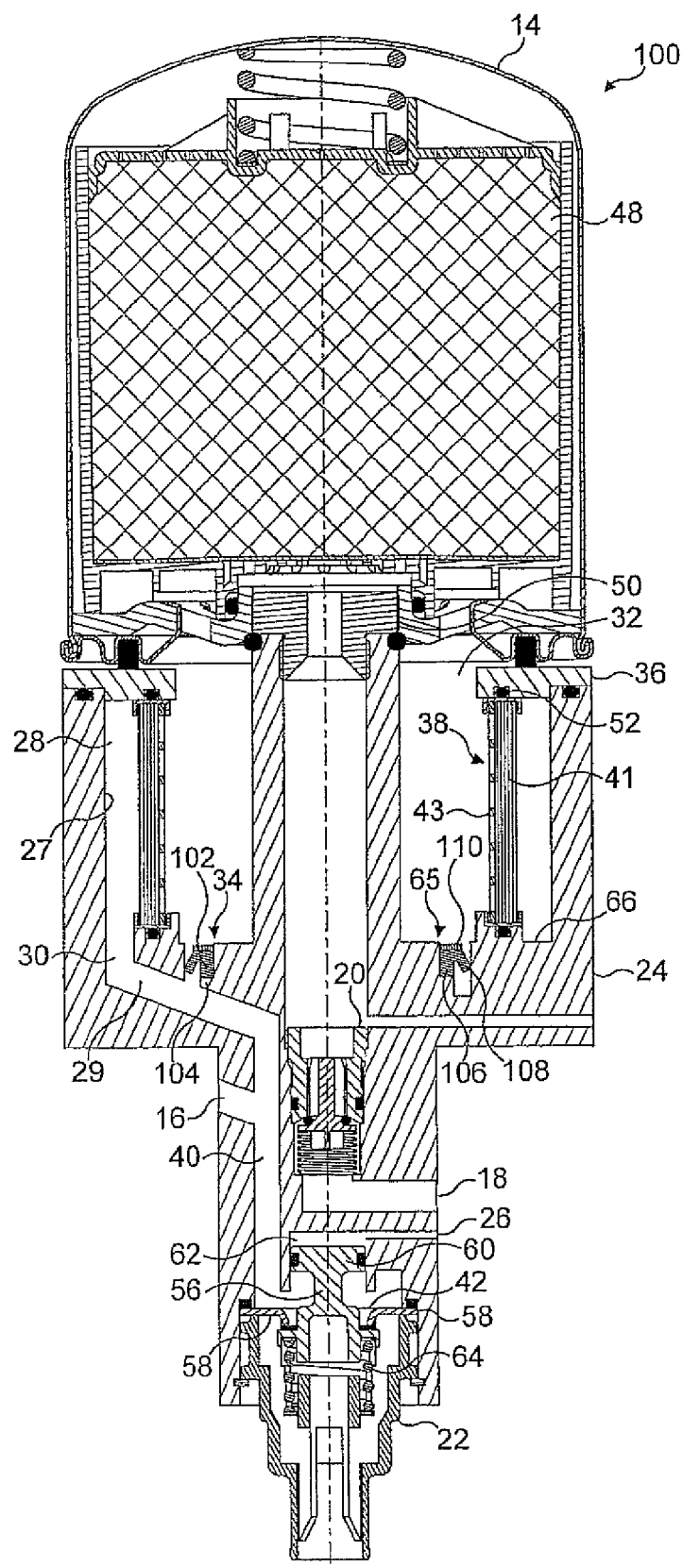
FIG. 3 shows a cross-sectional view of an alternative embodiment of a dryer according to the present invention.

FIG. 3 shows an cross-sectional view of an air dryer, generally designated 100, which conforms to an alternative embodiment of the present invention. Components and features common to the embodiment described with reference to FIGS. 1 and 2 are identified with like reference numerals. The air dryer of FIG. 3 differs from that of FIGS. 1 and 2 in that the bypass valve 34 comprises an annular valve member 102 as opposed to the spherical ball valve arrangement. The valve member 102 is configured so as to fit to a ledge 104 provided in a lower portion of the chamber 28 below the inner sump 65. The valve member 102 comprises an annular body 106 having a flexible lip 108 extending therefrom. The valve member 102 is retained on the ledge by means of a retaining ring 110. As can be seen from FIG. 3 the lip 108 extends across the passage 35 extending between the inner sump 65 and the conduit 29. The lip 108 acts in substantially the same manner as the valve member 44 of the dryer 10 described with reference to FIGS. 1 and 2. All of the incoming airflow is directed into the chamber 28 via the inlet 30, while a portion of the regeneration flow is permitted to pass through the passage 35 thereby bypassing the coalescing element 38.

Figure 4:
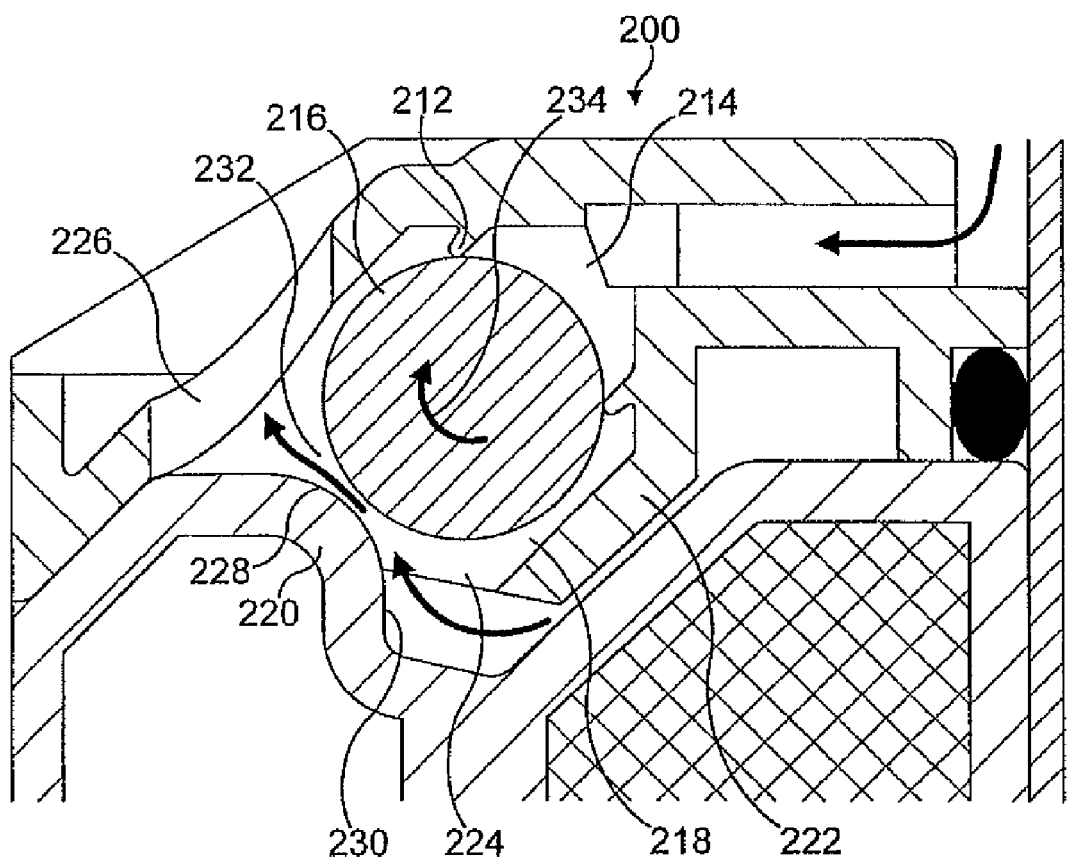
FIG. 4 shows a cross-sectional view of a ball valve.

Referring now to FIG. 4 there is shown a cross-sectional view of a valve, generally designated 200, according to an aspect of the present invention. The valve 200 is similar to the bypass valve 34 of the air dryer 10 described with reference to FIGS. 1 and 2. The valve 200 includes an annular seat 212 which surrounds an aperture 214 through which there is provided a flow path, and a spherical valve member or ball 216 which is movable into and out of contact with the seat 212. The ball 216 is constructed from a low density plastics material. FIG. 4 shows the ball 216 in contact with the seat 212 thereby blocking the aperture 214 and closing the flow path. The ball 216 is contained within a chamber 218 having a base 220 and a wall 222. The wall 222 is provided with an inlet 224 and an outlet 226 in a lower portion thereof. The seat and aperture 212, 214 are provided in an upper portion of the chamber 218. The width of the chamber 218 is greater than the diameter of the ball 216 and hence the ball 216 is freely movable within the chamber 218.

The inlet and outlet 224, 226 are smaller than the cross-sectional diameter of the ball 216 and hence the ball 216 is retained within the chamber 218. In the embodiment shown the seat 212 and aperture 214 are formed integrally with the wall 222 while the chamber base 220 is defined by a separate component fitted to the wall/seat arrangement. It will be appreciated that other seat 212, base 220 and wall 222 arrangements for the chamber 218 are possible. The base 220 projects into the chamber 218 in a convex manner and thus limits the longitudinal movement of the ball 216 within the chamber 218 to the spacing between the apex 228 of the base 220 and the seat 212. The chamber inlet 224 is angled with respect to the base such that air passing therethrough is directed to a side 230 of the base.

The ball 216 is movable towards and into contact with the seat 212 by the movement of air through the chamber 218 from the inlet 224 to the outlet 226. The ball 216 is movable out of contact with the seat 212 under the influence of gravity when the flow of air through the chamber 218 from the inlet 224 to the outlet 226 ceases. Movement of the ball 216 away from the seat 212 may be assisted by the supply of a pressurised fluid to the aperture 214.

Taking the instance where there is no airflow between the inlet 224 and outlet 226, it will be understood that the ball 216 will be positioned away from the seat 212 and hence the aperture 214 will be open. Air subsequently entering the chamber 218 via the inlet 224 encounters the side 230 of the base 220 which causes a change of direction of the airflow. The turbulence caused by the change of direction creates a slight increase in pressure sufficient to lift the ball 216 from the base 220 and towards the seat 212. In lifting from the base 220 the ball 216 creates a flow passage 232 between its lower surface and the base 220 which presents an unobstructed path between the inlet 224 and outlet 226 for the airflow. The continued flow of air through the flow passage 232 ensures that the ball 216 is urged against the seat and the aperture 214 closed.

The redirection of the airflow by the base 220 and its subsequent continuation through the flow passage 232 may cause the ball 216 to spin as indicated by arrow 234. The spinning of the ball 216 in this manner may distribute wear associated with repeated contact with the seat 212 over substantially the entire surface of the ball 216 and further may act to remove debris which may collect on the surfaces of the ball 216 and seat 212 during periods of valve inactivity. It will be appreciated that a valve 200 having the configuration described above may be utilised at or in locations other than an air dryer body, for example the valve may be used within a desiccant cartridge.

The invention claimed is:

1. An air dryer for a vehicle air system, the air dryer including a body and a desiccant canister, the body having an inlet to receive air from an air source, an outlet to supply air to a vehicle air system, a purge outlet and a regeneration inlet to receive regenerative airflow from the vehicle air system, wherein the body is further provided with a chamber containing a coalescing means positioned between the inlet and the desiccant canister, and a bypass valve positioned between the chamber and the purge outlet, the coalescing means and bypass valve being arranged such that during normal operation air entering through the inlet passes through the coalescing means before reaching the desiccant and during regeneration of the desiccant a portion of the regeneration flow passes through the coalescing means and the remainder of the regeneration flow bypasses the coalescing means through the bypass valve, wherein the chamber and coalescing means are fully provided within the air dryer body.

2. An air dryer as claimed in claim 1, wherein the bypass valve includes a valve member which is urged to a closed position, thereby preventing the flow of fluid through the bypass valve, by fluid flow entering the air dryer through the inlet.

3. An air dryer as claimed in claim 2, wherein the bypass valve comprises a flow passage having a movable valve member contained therein.

4. An air dryer as claimed in claim 3, wherein the flow passage is provided with a seat and the valve member is movable between a position in contact with the seat and a position spaced from the seat.

5. An air dryer as claimed in claim 4, wherein the flow passage and valve member are arranged such that under certain operating circumstances the valve member is movable from the seat position under the influence of gravity.

6. An air dryer as claimed in claim 3, wherein the valve member comprises a component which is separate from the flow passage and freely movable therein.

7. An air dryer as claimed in any of claim 3, wherein the valve member is constrained to move within a portion of the flow passage.

8. An air dryer as claimed in claim 7, wherein the valve member is connected to a tether.

9. An air dryer as claimed in claim 7, wherein the valve member is located between appropriately configured stops.

10. An air dryer as claimed in claim 2, wherein the valve member is a flexible member.

11. An air dryer as claimed in claim 10, wherein the flexible member is provided with a proximal portion fixed to the dryer body, and a movable distal portion.

12. An air dryer as claimed in claim 10 wherein the flexible member is positioned in a lower region of the chamber between the coalescing means and the base of the chamber.

13. An air dryer as claimed in claim 1, wherein the chamber further includes a sump associated with the coalescing means.

14. An air dryer as claimed in claim 13, wherein the sump is located in the vicinity of the bypass valve such that purge flow directed through the valve entrains any liquid contained in the sump.

15. An air dryer as claimed in claim 13, wherein the chamber is provided with two sumps arranged on respective upstream and downstream sides of the coalescing means.

16. An air dryer as claimed in claim 1, wherein the coalescing means is cylindrical.

17. An air dryer as claimed in claim 1, wherein the coalescing means is removable from the chamber.

18. An air dryer as claimed in claim 17, wherein the chamber is provided with a removable cover to permit access to and removal/fitting of the coalescing means.

19. An air dryer as claimed in claim 18, wherein the coalescing means is retained between the cover and a seat of the chamber.

20. A body for air dryer for a vehicle air system, the air dryer body having a mounting arrangement for a desiccant canister, the body further having an inlet to receive air from an air source, an outlet to supply air to a vehicle air system, a purge outlet and a regeneration inlet to receive regenerative airflow from the vehicle air system, wherein the body is further provided with a chamber containing a coalescing means positioned between the inlet and the desiccant canister mounting, and a bypass valve positioned between the chamber and the purge outlet, the coalescing means and bypass valve being arranged such that during normal operation air entering through the inlet passes through the coalescing means before reaching a desiccant canister provided at said mounting arrangement, and during regeneration of the desiccant a portion of the regeneration flow passes through the coalescing means and the remainder of the regeneration flow bypasses the coalescing means through the bypass valve, wherein the chamber and coalescing means are fully provided within the air dryer body.

* * * * *